Oct. 14, 1952     E. E. SIVACEK     2,613,386
WINDSHIELD WIPER DRIVE MECHANISM
Filed Nov. 13, 1945     4 Sheets-Sheet 1
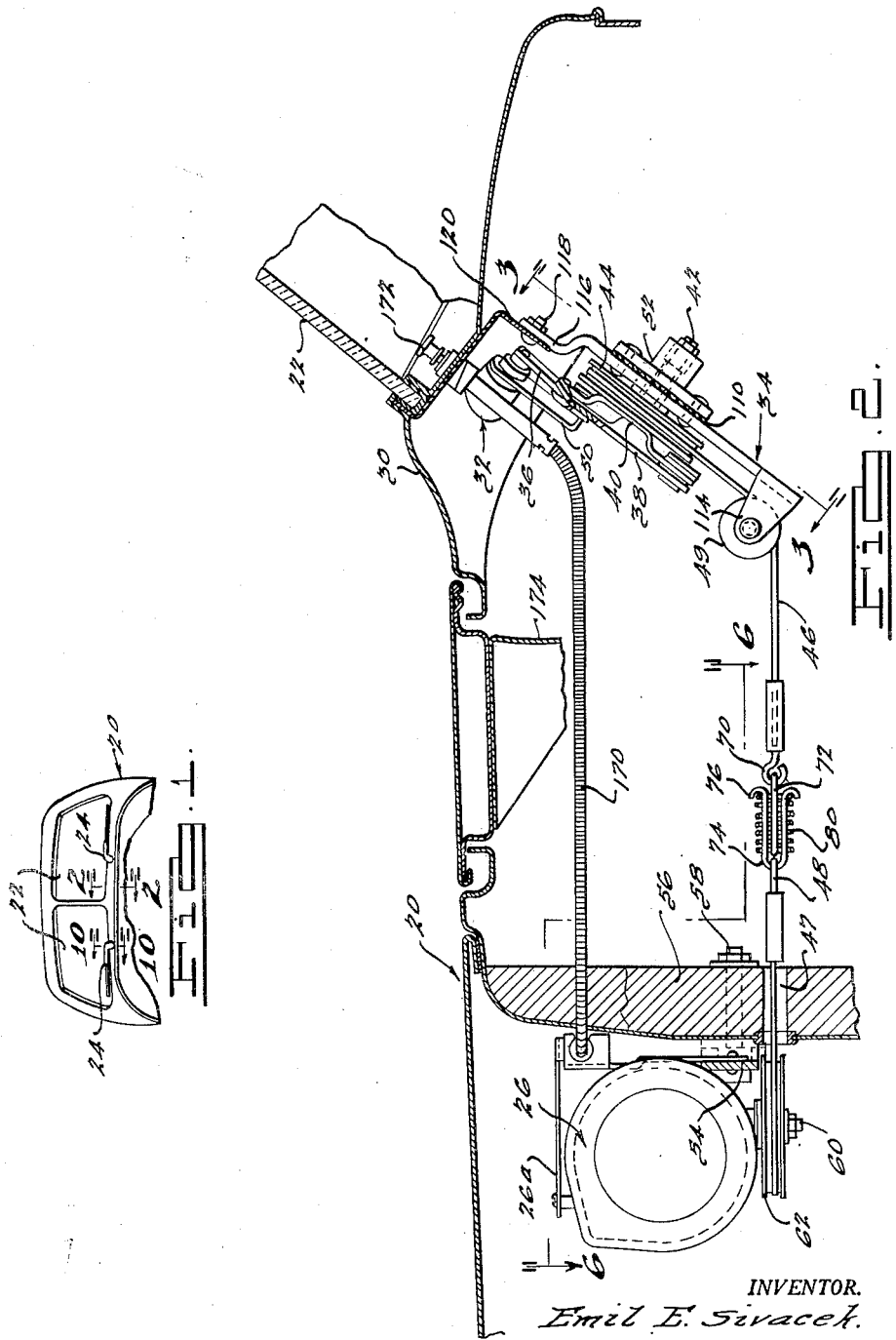
INVENTOR.
Emil E. Sivacek.
BY
Harness, Dickey & Pierce
ATTORNEYS.

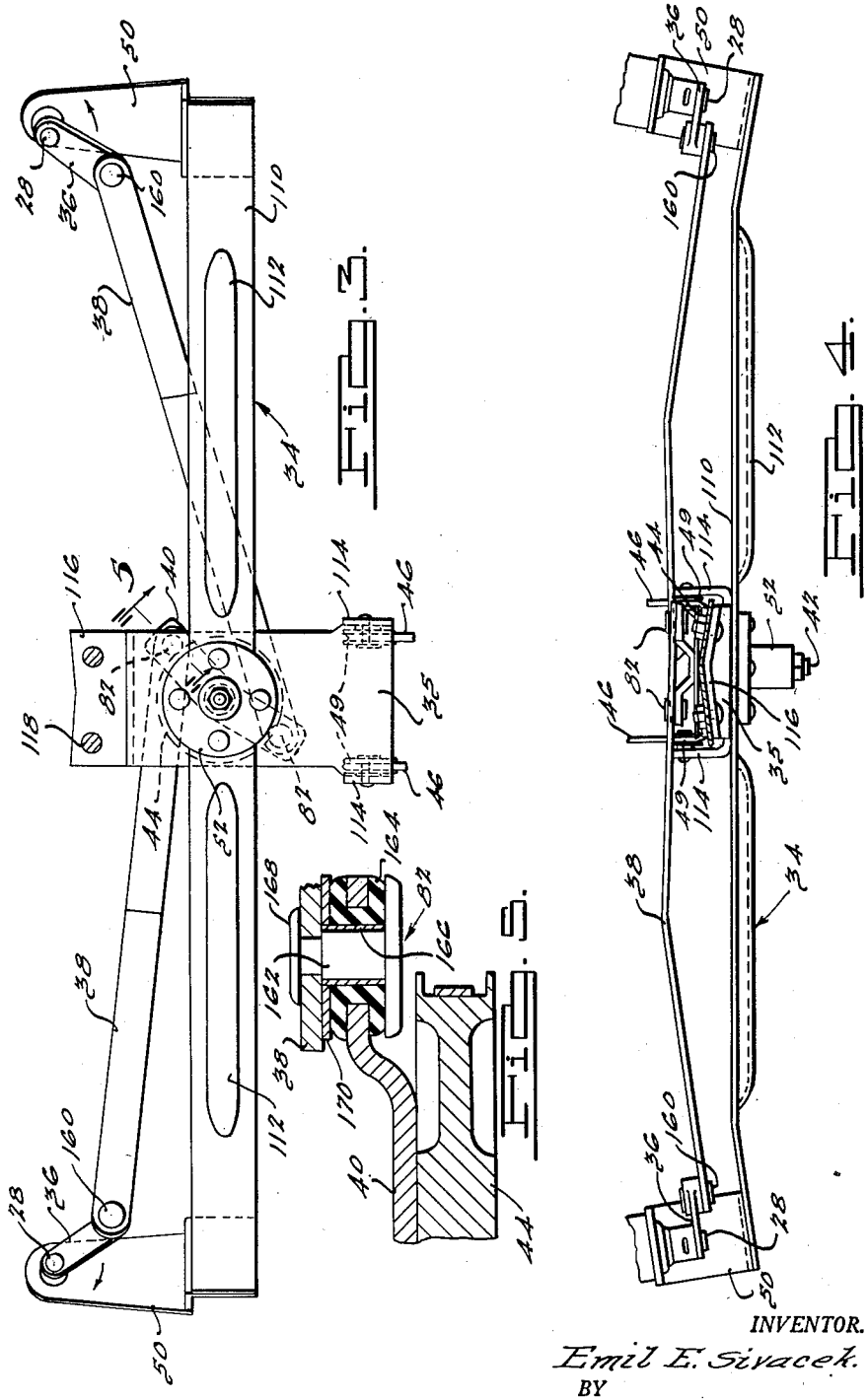

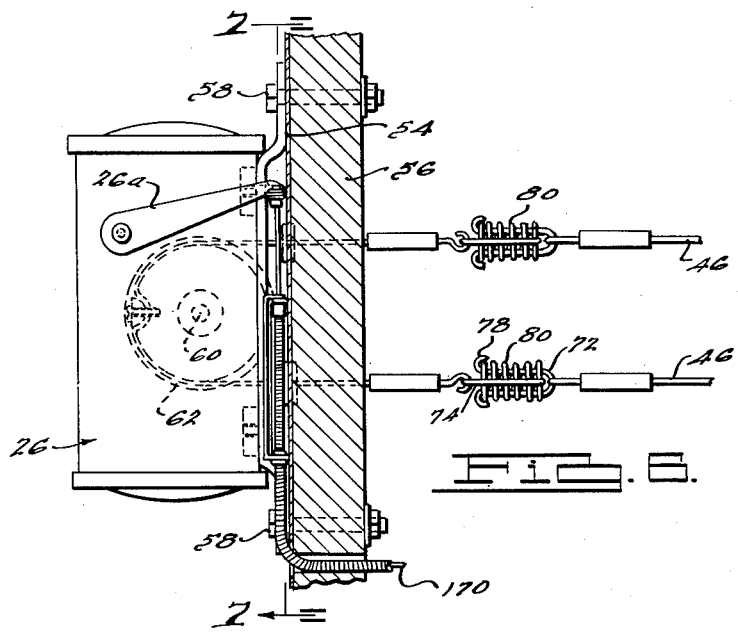
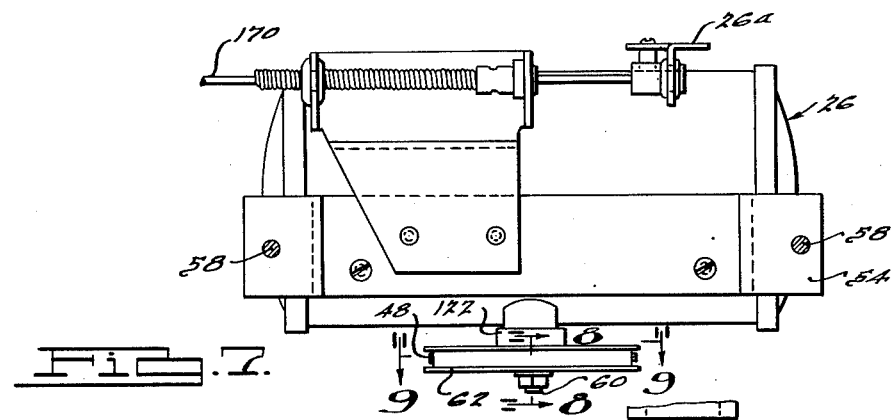
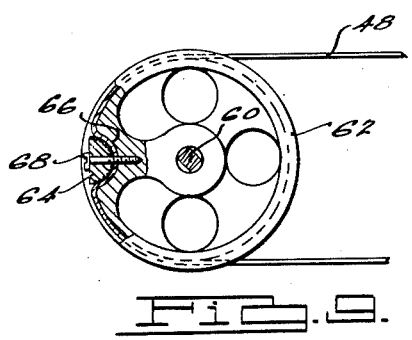
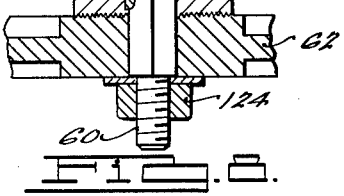

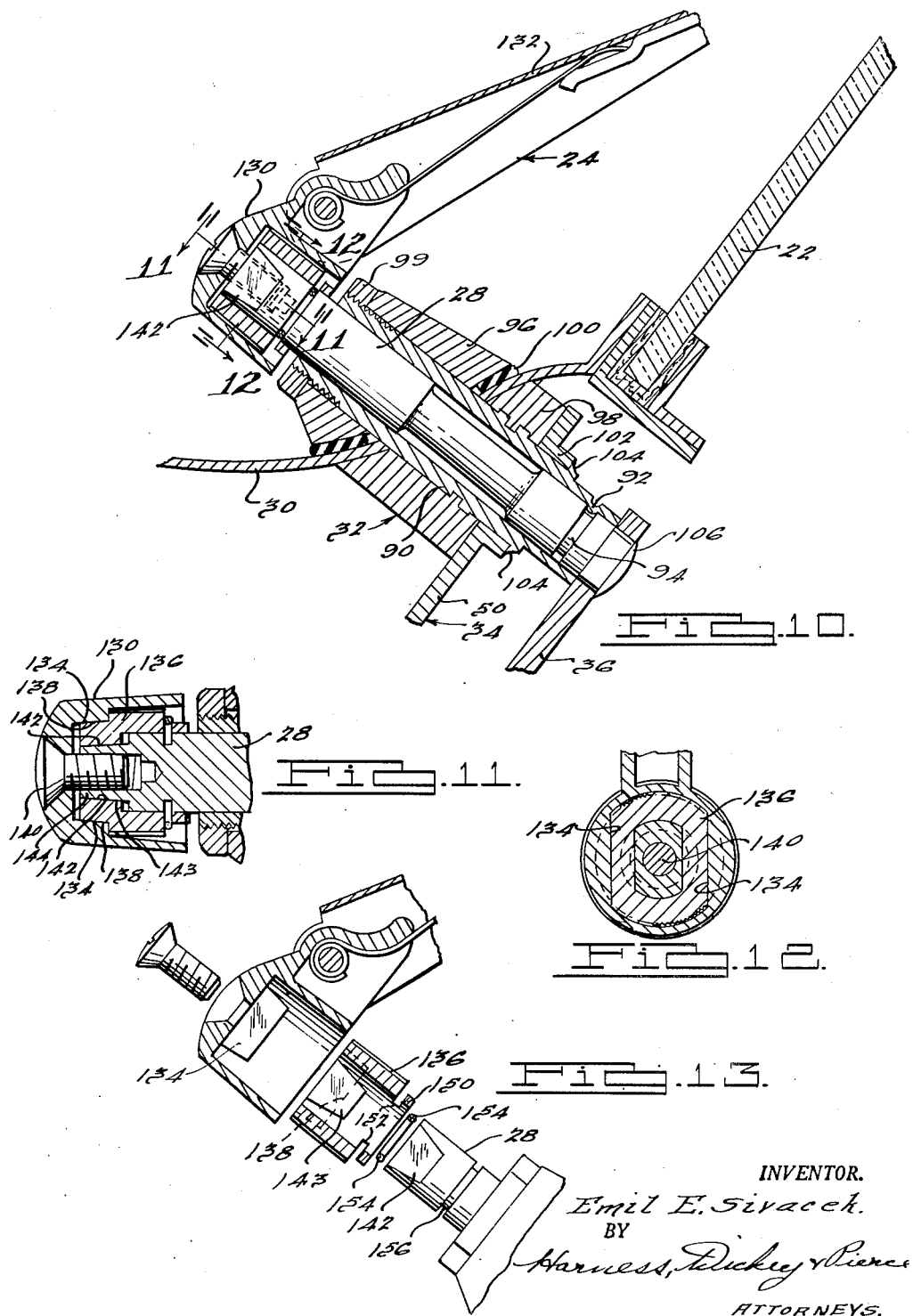

Patented Oct. 14, 1952

2,613,386

UNITED STATES PATENT OFFICE 2,613,386

WINDSHIELD WIPER DRIVE MECHANISM

Emil E. Sivacek, Ann Arbor, Mich., assignor to King-Seeley Corporation, Ann Arbor, Mich., a corporation of Michigan Application November 13, 1945, Serial No. 628,159

16 Claims. (Cl. 15—253)

1

The present invention relates to windshield wiper equipment, and is particularly directed to the provision of improved arrangements for supporting the driving motor and the wiper shafts of a dual wiper system in an associated vehicle, and of an improved driving connection between the motor and the wiper shafts.

Principal objects of the present invention are to provide a system of the above generally indicated character which is simple in arrangement, economical of manufacture and assembly, and which provides improved operating characteristics; to provide such a system which materially simplifies the operations involved in attaching or applying the equipment to an associated vehicle; to provide such a system wherein the mounting means inherently insures that the wiper shafts, when applied to the vehicle, will move through substantially identical arcs which are located in substantial symmetry with respect to the associated windshield; and wherein a single adjustment, preferably at the motor, may be made to govern the size as well as the location of such arcs with respect to the windshield; to provide such a system embodying a unitary mounting unit, adapted to be mounted beneath the cowl of an associated vehicle, and which carries a pair of wiper shafts and associated mounting swivels and a power transmitting element common to such shafts, said power transmitting element being adapted to be connected, by flexible transmission means, to a remotely located motor, positioned, for example, within the engine compartment of the vehicle; to provide improved connections between individual wiper shafts and wiper arms, which insure that the arms are applied to the shafts in proper relative rotative positions; and to generally improve and simplify the construction and arrangement of dual windshield wiper systems and mounting arrangements therefor.

With the above as well as other and, in certain cases, more detailed objects in view, which appear in the following description, and in the appended claims, a preferred but illustrative embodiment of the invention is shown in the accompanying drawings, throughout the several views of which corresponding reference characters are used to designate corresponding parts, and in which:

Figure 1 is a fragmentary view in front elevation of a vehicle embodying the dual windshield wiper system of the present invention;

Figure 2 is a view in longitudinal section, taken along the line 2—2 of Figure 1;

Figure 3 is a view in rear elevation, of a portion of the windshield wiper system, taken along the line 3—3 of Figure 2;

Figure 4 is a plan view of the structure shown in Figure 3;

Figure 5 is a fragmentary view, in section, taken along the line 5—5 of Figure 3;

Figure 6 is a view in top plan, taken along the line 6—6 of Figure 2;

Figure 7 is a view in side elevation of the wiper motor, taken along the line 7—7 of Figure 6;

Figure 8 is a view in section, taken along the line 8—8 of Figure 7;

Figure 9 is a view, partly in section, taken along the line 9—9 of Figure 7;

Figure 10 is a view in longitudinal central section, taken along the line 10—10 of Figure 1;

Figures 11 and 12 are views in section, taken, respectively, along the lines 11—11 and 12—12 of Figure 10; and, Figure 13 is an exploded view of the swivel structure shown in Figures 10, 11, and 12.

It will be appreciated from a complete understanding of the present invention that, in a generic sense, the improvements thereof may be embodied in windshield wiper systems of various different designs, arranged for use in connection with various different vehicles. A preferred application of the invention is in connection with so-called cowl mounted dual wiper systems, wherein, in order to reduce the noise level within the passenger compartment of the vehicle, the driving motor for the wipers is located within the engine compartment. In an illustrative but not in a limiting sense, except in so far as is defined in the claims, the invention is so disclosed herein.

Referring to the drawings, the illustrative vehicle 20, which is provided with a usual rearwardly inclined V-type windshield comprising glass sections 22, is provided with a windshield wiper system comprising generally a pair of identical wipers 24, which are adapted to be oscillated through arcs, of similar size and location with respect to the associated glass sections, by means of a driving motor 26. In their normal or parked positions, shown in Figure 1, the two wipers 24 lies in substantially horizontal positions, immediately adjacent the lower margins of the associated glass sections.

Each wiper 24 is releasably connected, as described below, to an oscillatory wiper shaft 28, the two shafts 28 being supported in predetermined relation to each other and to the cowl 30 of the vehicle 20, by means of swivels 32 and a unitary interconnecting bracket 34. Each wiper shaft 28 carries a crank 36, which is pivotally connected, by means of an associated link 38, to the corresponding end of a cross arm 40, which, in the illustrated embodiment, is drivingly connected to a shaft 42, which also drivingly carries a grooved pulley 44, over which an endless cable composed of two sections 46 and 48, is trained. The section 46 is also trained over a pair of idler pulleys 49. The individual swivels 32 are rigidly fixed to upwardly directed end portions 50 of the bracket 34, and the shaft 42 is rotatably supported in a bearing member 52 which is rigidly connected to the bracket 34. The idler pulleys 49 are also carried by the generally vertically directed section 35 of bracket 34.

The wiper motor 26 may be of any desired type, but, by way of illustration, is illustrated as being of the double piston suction operated type, certain features whereof are described and claimed in Bell Patent No. 2,354,189, granted July 25, 1944, and in the copending application of the present applicant Serial No. 610,557, filed August 13, 1945. As shown, motor 26 is secured, by means of a mounting bracket 54, to the forward face of the usual fire wall 56, which separates the engine compartment of the vehicle 20 from the passenger compartment thereof. Bracket 54 is shown as being held in place by through bolts 58. In accordance with the present invention, the oscillatory shaft 60 of motor 26 carries, in adjustable relation thereto, a grooved pulley 62, over which the previously mentioned motor section 48, of the driving cable, is trained. Preferably and as shown, slippage between pulley 62 and the cable section 48 is prevented by a locking member 64, which is secured within a peripheral depression 66 in pulley 62, by means of a stud 68, the cable 48 being received between the fitting 64 and the face of the pulley. A similar expedient may be and preferably is employed to prevent slippage between the cable section 46 and the previously mentioned pulley 44.

The respective ends of the two cable sections 46 and 48 are detachably hooked together by means of a yieldable assembly, comprising a hook 70 provided at each end of section 46, and a hook 72 provided at each end of section 48. Each hook 72 is connected to the corresponding end of section 48, by means of a spring assembly comprising a U-shaped section 74 the bight whereof is passed through an eyelet at the corresponding end of the cable, and which has outwardly turned ends 76. The hook 72 is also of U-shaped form and is provided with outwardly turned ends 78. A spring 80 is held in place between the outwardly turned ends 76 and 78, and permits a limited amount of elongation of the endless cable, as will be understood.

With the foregoing arrangement, it will be appreciated that oscillatory movements of the motor driven pulley 62 are transmitted to and cause corresponding oscillatory movements of pulley 44 and of cross arm 40, the relative amplitudes of these oscillatory movements being determined in accordance with the relative diameters of pulleys 62 and 44 and by the length of cross arm 40 in relation to the diameter of pulley 44. In general, it is preferred to use pulleys 44 and 62 having like diameters and in the illustrated embodiment the crank 40 has a length which is somewhat in excess of the diameter of pulley 44.

Continuing with the general statement of operation, the angular movements of cross arm 40 are transmitted, through links 38, to the cranks 36, and cause corresponding angular movements of the wiper shafts 28 and wipers 24, it being noted, that, with the illustrated arrangement, the wipers 24 move in respectively opposite directions. The relative length of cranks 36 and cross arm 40, of course, determine the relative amplitudes of the cross arm and wiper shaft movements, a one-to-one ratio being illustrated in the drawings.

Considering certain of the above generally described elements in more detail, each swivel 32 comprises a sleeve 90, within which the associated shaft 28 is rotatable, relative axial movement between the two being prevented, as shown, by one or more tongues 92 which are depressed inwardly from the surface of the sleeve 90, and are received in an annular groove 94 provided therefor in the shaft 28. The assembly comprising sleeve 90 and shaft 28 is secured in place relative to the associated cowl 30, by means of a housing formed of inner and outer, and preferably die cast, sections 96 and 98. Section 98 may be and preferably is cast with the sleeve 90 and shaft 28 in place, so as to fix the relative positions thereof. Section 96 is removable from the sleeve 90, and is held in place thereon by a nut 99. A gasket 100 may be and preferably is interposed between the housing section 96 and the cowl 30, it being appreciated that the cowl is apertured to accommodate the passage of the sleeve 90 therethrough, and that the juxtaposed faces of the housing sections 96 and 98 are complemental, and are shaped to conform to the curvature of the cowl.

The assembly comprising the housing section 98 and sleeve 90 are rigidly secured to the previously mentioned upwardly extending portion 50 of the main supporting bracket 34. More particularly, and as shown, each portion 50 is provided with a neck 102 which receives the sleeve 90. The face of each bracket portion 50 abuts the inner end of the housing section 98, and the assembly operation is completed by ring staking the sleeve, as indicated at 104.

The inner end of each shaft 28 is provided with a flattened section, which is received in a noncircular opening in the corresponding crank 36, the connection being completed by peening over the end of the shaft 28, as indicated at 106.

The bracket 34 comprises an elongated body member 110, which may be ribbed, as indicated at 112, to strengthen it, and to the respectively opposite ends of which the generally L-shaped portions 50 are rigidly secured, as by welding. The previously identified upright bracket member 35 is rigidly secured to the member 110, intermediate the ends of the latter and, as previously mentioned, serves as a mounting for the shaft bearing member 52, as well as for the pulleys 49, which are carried by forwardly turned flange portions 114, formed on member 35.

It will be noticed that the entire assembly comprising the swivels 32, the shafts 28, bracket 34, pulley 44, crank 40, cranks 36 and links 38, and cable section 46 may be and preferably are manufactured as a subassembly, which can be bodily applied to the associated vehicle by passing the swivel sleeves 90 through the associated cowl openings, and applying the outer housing sections 96 thereto. No further supporting connections, other than are afforded by the swivels 32, need be provided for the above described assembly. In certain instances, however, to minimize the possibilities of vibration of the elongated bracket 34, as well as to reinforce it against the pulling force of the endless cable 46—48 thereon, an additional mounting connection between the vehicle body and the bracket 34 may be made. As shown, the upper end 116 of the bracket section 35 is provided with mounting openings, to receive bolts 118, by which it may be secured to a transversely extending body portion 120.

It is to be particularly noted that the above described cowl assembly inherently locates the two swivel shafts 28 in properly spaced locations with respect to each other and with respect to the cross arm 40 and, since the swivels have a piloting effect when the outer housing members 96 are applied, the swivels are automatically located in proper position relative to the cowl, with the swivel axes substantially normal to the corresponding glass sections. Accordingly, since the links 38 and cranks 36 are correspondingly dimensioned, the two swivel shafts 28 are automatically caused to assume corresponding rotative positions with respect to each other. It is within the purview of the invention to include an adjustment between the shaft 42 and the wipers 24 as by making one or both of links 38 of adjustable length, but the use of the unitary bracket 34 ordinarily makes such adjustments unnecessary. As described below, the arms 24 are keyed to the swivel shafts in predetermined rotative positions with respect thereto, so that the wiper arms necessarily assume corresponding rotative positions, determined by the position of the cross arm 40. This positioning and aligning function of the unitary bracket 34 is of substantial importance from a practical standpoint, as will be readily understood by those familiar with windshield wiper operating and installation problems. The operation of installing the motor is, of course, readily completed by applying the attaching bracket 54 to the fire wall 56, and by thereafter projecting the cable portions 48 through the openings 47 provided therefor in the fire wall 56. Ordinarily, the spring connector 72—74—80, is assembled with the cable section 46, so that the openings 47 may be relatively small in size, and it will be appreciated that after the motor and cowl assemblies are secured in place, the cable ends are connected together.

As previously mentioned, the pulley 62 is adjustably secured to the motor shaft 60. Referring more particularly to Figure 8, the shaft 60 has keyed thereto a washer or collar 122, the outer face whereof is serrated. The relatively softer pulley 62 which is forced along the shaft 60, by the nut 124, directly abuts the collar 122, and is firmly maintained in nonrotative relation thereto by the driving effect of the serrated face.

If for any reason (such, for example, as unequal elongations of the cable springs 80, or if the cable sections are not secured to the pulleys at the midpoints of the sections) the swivel shafts 28 do not have desired rotative positions in relation to the limits of movement of the motor pistons (not shown) and pulley 62, any such misadjustments may be readily corrected, during installation of the wiper equipment, by loosening the nut 124, moving the motor pistons to a desired position, moving the wiper shafts 28 (and consequently pulleys 44 and 62) to a corresponding desired position and thereafter re-tightening the nut 124. The use of an adjustment common to both wiper shafts will be recognized as definitely insuring that both wipers are adjusted to like degrees.

As previously mentioned, the arm to shaft connections for the wipers are preferably such that the wiper arms can be secured to the wiper shafts 28 in only predetermined positions, thus insuring that the arcs of movement of the individual wipers will be correspondingly positioned with respect to the corresponding glass sections. Referring to Figures 10 through 13, a preferred arm to shaft connecting assembly is illustrated. In these figures, the shaft receiving section 130 of each wiper arm 24, which may be conventionally pivoted to the associated outer or blade carrying section 132, is provided with a shaft receiving socket of generally cylindrical conical form, having a pair of diametrically opposite radially inwardly projecting flats 134 positioned near the base of the socket. The shaft 28 is provided with an enlarged arm receiving head 136, also of generally cylindrical form, having flatted sides 138 located at diametrically opposite sides thereof, adjacent the outer end. The flats 134 and 138 are correspondingly tapered, so that when the arm section 130 is fitted over the head 136, a wedging engagement is afforded therebetween, which provides a rotative driving connection between the two, and also positively prevents cocking of the arm section 130 relative to the head 136. As illustrated, a stud 140 is freely passed through an opening provided therefor in the base of the arm socket, and is threadably received in a tapped opening provided in the outer end of the shaft 28. By tightening the screw, the arm section 130 is tightly drawn into interlocking and driving engagement with the head 136.

Generically, the head 136 may, of course, be integral with or removable from the outer end of the wiper shaft 28. Preferably, the head 136 is made removable so as to minimize the size of the swivel receiving opening which must be provided in the cowl 30 of the vehicle. With this arrangement, the shaft and swivel assembly may be applied to the cowl and thereafter the head 136 may be secured in place upon the outer end of the shaft 28.

As illustrated, the outer end of the shaft is provided with a pair of diametrically opposite under cut, tapered, flatted portions 142, and the outer end portion of the bore provided in the head 136 is shaped, with tapered flats 143, to conform to the shape of the flatted end section 144 of the shaft. The head 136 and the shaft 28 thus have a wedging interlocking fit with each other which provides a positive rotative drive therebetween, and also prevents cocking of the head relative to the shaft.

It will be noticed that the screw 140, being threaded into the outer end of the shaft, serves to hold the shaft 28, the head 136, and the arm section 130, in properly assembled relation to each other, so that no additional securing means is needed to maintain the head 136 on the shaft so long as the arm section 130 is in place thereon. It is preferred, however, to provide readily applied means to hold the head 136 in place on the shaft 28, in the absence of the arm 130. As shown, the inner end 150 of the head 136 is reduced, and adjacent the junction between the reduced end portion 150 and the body of the head, the reduced portion 150 is provided with a pair of reduced portion 150 is provided with a pair of diametrically opposite chordal notches 152, adapted respectively, to receive the legs 154 of a spring-like retaining clip. In aligned relation to the notches 152, the shaft 28 is provided with an annular groove 155, which is also adapted to accommodate the legs 154. Ordinarily the spring clip is assembled with the head 136 before the latter is fitted in to the shaft, in which event the spacing between the legs 154 is less than the diameter of the shaft, but greater than the width of the flatted end portion of the shaft. To apply the head to the shaft, it may be started on to the shaft in a position approximately ninety degrees around from its final position, bringing the clip legs over the flatted shaft portion. Thereafter, the head 136 may be turned to its proper rotative position, which action spreads the clip legs and enables them to pass along the surface of the body of the shaft 28 until the head reaches the final position, at which time the clip legs 154 snap into place in the shaft groove 156, thereby completing the assembly.

Reverting to Figures 3, 4, and 5, it will be recognized that the wiper shafts 28 are angularly disposed relative to the pulley shaft 42 so that rocking movements of the cross arm 40 cause some flexing movements between the pivots 160 which connect the links 38 to the crank 40 as well as between the pivots 82 which interconnect the links 38 to the cross arm 40, which flexing movements are transverse to the normal pivotal movements which take place about these pivot connections. To silence the just-mentioned pivot connections, while readily accommodating the above-mentioned flexing movements, it is preferred to incorporate silencing material therein. More particularly, as shown in Figure 5, each pivot connection 82 comprises a headed pin 162, which rotatably receives a grommet 164, having a bushing 166, and which grommet 164 is received in an opening provided therefor in the outer end of the cross arm 40. The end of the corresponding link 38 is held in place between the head 168 of the pin 162, and a washer 170 which abuts the face of the grommet. The connections 160 may be correspondingly arranged.

In order to insure the parking of the wipers 24 in out of the way positions, such as shown in Figure 1, it is, of course, preferred to provide the motor 26 with means for automatically causing it to come to rest at a position outside its normal limits of travel. Such combined parking and starting control mechanism may respond to the control lever 26a on motor 26, which lever may be coupled, through a Bowden wire 170, to a usual push pull, or otherwise arranged, control button 172, located on the cowl of the vehicle 20. As shown, in order to enable it to clear the usual cowl ventilator structure 174, wire 170 is passed through the fire wall 56, at a point which is located to one side of the path of the endless cable 46—48.

Although only a single specific embodiment of the invention has been described in detail, it will be appreciated that various modifications in the form, number, and arrangement of the parts may be made without departing from the spirit and scope of the invention.

What is claimed is:

1. In a vehicle windshield wiper system, a plurality of spaced wiper actuating shafts, a power transmitting mechanism, transmission means coupling said shafts and mechanism, a unitary mounting means adapted for securement in predetermined relation to said windshield, said shafts, mechanism and transmission means being carried by said mounting means and being supported thereby in predetermined positions with respect to each other, motive mechanism for moving said shafts and adapted to be carried by said vehicle remotely from said mounting means, additional transmission means coupling said motive mechanism to said power transmitting mechanism, and means common to said shafts and operable to simultaneously adjust the location of the arc of movement of each of said shafts relative to said windshield.

2. In a vehicle windshield wiper system, a plurality of spaced wiper actuating shafts, a power transmitting mechanism, transmission means coupling said shafts and mechanism, a unitary mounting means adapted for securement in predetermined relation to said windshield, said shafts, mechanism and transmission means being carried by said mounting means and being supported thereby in predetermined positions with respect to each other, motive mechanism for moving said shafts and adapted to be carried by said vehicle remotely from said mounting means, additional transmission means coupling said motive mechanism to said power transmitting mechanism, and means for adjusting the driving relation between said motive mechanism and said additional transmission means whereby to simultaneously adjust the location of the arc of movement of each of said shafts relative to said windshield.

3. In a vehicle windshield wiper system, a plurality of spaced wiper actuating shafts; a unitary mounting means adapted for securement in predetermined relation to a windshield, said shafts being carried by said mounting means and being supported thereby in definite positions with respect to each other; motive mechanism for moving said shafts; and means interconnecting said motive mechanism and said shafts, said means including means connected between said shafts for maintaining said shafts in predetermined angular relationship to each other, means enabling said motor to angularly move said shafts, and means common to said shafts and operable to simultaneously and correspondingly adjust the driving relation of said shafts to said motive mechanism to adjust the location of the arc of movement of each of said shafts relative to said windshield without substantially altering the amplitude of the angular movement of either of said shafts.

4. The system of claim 3 including means to adjust the relative position of one of said shafts with respect to another of the shafts.

5. In a vehicle windshield wiper system, a plurality of spaced wiper actuating shafts; a unitary mounting means adapted for securement in predetermined relation to a windshield, said shafts being carried by said mounting means and being supported thereby in definite positions with respect to each other, motive mechanism for moving said shafts and adapted to be carried by said vehicle remotely from said mounting means; and means interconnecting said motive mechanism and said shafts, said means including means connected between said shafts for maintaining said shafts in predetermined angular relationship to each other, means enabling said motive mechanism to move said shafts, and means common to said shafts and operable to simultaneously and correspondingly adjust the location of the arc of movement of each of said shafts relative to said windshield.

6. The system of claim 5 including means to adjust the relative position of one of said shafts with respect to the other shaft.

7. In a vehicle windshield wiper system, a plurality of spaced wiper actuating shafts, a power transmitting mechanism, transmission means coupling said shafts and mechanism, a unitary mounting means adapted for securement in predetermined relation to said windshield, said shafts, mechanism and transmission means being carried by said mounting means and being supported thereby in predetermined positions with respect to each other, motive mechanism for moving said shafts and adapted to be carried by said vehicle remotely from said mounting means, and additional reciprocatory transmission means detachably coupling said motive mechanism to said power transmitting mechanism, said additional transmission means including a pulley adjustably connected to one of said mechanisms and a flexible cable trained over said pulley.

8. In a vehicle windshield wiper system, a plurality of spaced wiper actuating shafts, a power transmitting mechanism, transmission means coupling said shafts and mechanism, a unitary mounting means adapted for securement in predetermined relation to said windshield, said shafts, mechanism and transmission means being carried by said mounting means and being supported thereby in predetermined positions with respect to each other, motive mechanism for moving said shafts and adapted to be carried by said vehicle remotely from said mounting means, and additional reciprocatory transmission means detachably coupling said motive mechanism to said power transmitting mechanism, said additional transmission means including a pulley adjustably connected to said motive mechanism and a flexible cable trained over said pulley.

9. In a vehicle windshield wiper system, a plurality of spaced wiper actuating shafts, a power transmitting mechanism, transmission means coupling said shafts and mechanism, a unitary mounting means adapted for securement in predetermined relation to said windshield, said shafts, mechanism and transmission means being carried by said mounting means and being supported thereby in predetermined positions with respect to each other, motive mechanism for moving said shafts and adapted to be carried by said vehicle remotely from said mounting means, additional reciprocatory transmission means detachably coupling said motive mechanism to said power transmitting mechanism, and means to adjust the relative position of one of said shafts with respect to another of said shafts.

10. In a vehicle windshield wiper system, a plurality of spaced wiper actuating shafts; a unitary mounting means adapted for securement in predetermined relation to a windshield, said shafts being carried by said mounting means and being supported thereby in definite positions with respect to each other; motive mechanism for moving said shafts; and means interconnecting said motive mechanism and said shafts, said means including means connected between said shafts for maintaining said shafts in predetermined angular relationship to each other, means enabling said motor to angularly move said shafts, and means common to said shafts and operable to simultaneously and correspondingly adjust the driving relation of said shafts to said motive mechanism to adjust the location of the arc of movement of each of said shafts relative to said windshield without substantially altering the amplitude of the angular movement of either of said shafts, said interconnecting means including a pulley adjustably connected to said motive mechanism and a flexible cable trained over said pulley.

11. In a vehicle windshield wiper system, a plurality of spaced wiper actuating shafts; a unitary mounting means adapted for securement in predetermined relation to a windshield, said shafts being carried by said mounting means and being supported thereby in definite positions with respect to each other, motive mechanism for moving said shafts and adapted to be carried by vehicle remotely from said mounting means; and means interconnecting said motive mechanism and said shafts, said means including means connected between said shafts for maintaining said shafts in predetermined angular relationship to each other, means enabling said motor to move said shafts, and means common to said shafts and operable to simultaneously and correspondingly adjust the location of the arc of movement of each of said shafts relative to said windshield, said interconnecting means including a pulley adjustably connected to said motive mechanism and a flexible cable trained over said pulley.

12. In a vehicle windshield wiper system, a plurality of spaced wiper actuating shafts, and means for simultaneously oscillating said shafts through equal arcs of movement and comprising a power transmitting mechanism, transmission means coupling said shafts and mechanism, a unitary mounting means adapted for securement in predetermined relation to said windshield, said shafts, mechanism and transmission means being carried by said mounting means and being supported thereby in predetermined positions with respect to each other, motive mechanism for moving said shafts and adapted to be carried by said vehicle remotely from said mounting means, additional transmission means coupling said motive mechanism to said power transmitting mechanism, and means common to said shafts and operable to simultaneously adjust the location relative to said windshield of the center position of each of said shafts in its said arc of movement.

13. In a vehicle windshield wiper system, a plurality of spaced wiper actuating shafts, motive mechanism for moving said shafts through corresponding arcs of movement and adapted to be carried by said vehicle remotely from said shafts, transmission means coupling said shafts and said motive mechanism, and means at said motive mechanism for varying the driving relation of said shafts to said mechanism to adjust the location of said arcs of movement of said shafts relative to said windshield.

14. A driving mechanism for effecting oscillatory movement of windshield wipers and the like comprising a unitary support adapted to be mounted in predetermined relation to the windshield, driven shaft supporting means carried thereby, a driven shaft carried by said supporting means, and means for transmitting oscillatory movement to said shaft, said last named means including pulley means fast upon said shaft, guiding means also rotatably supported upon said support, an endless cable-type power-transmitting means trained over said pulley means and guiding means and adapted to be rove over a driving motor pulley, and means securing a portion of said endless cable-type power-transmitting means to said pulley means.

15. In a vehicle windshield wiper system, a plurality of spaced wiper actuating shafts, motive mechanism for moving said shafts through corresponding arcs of movement and adapted to be carried by said vehicle remotely from said shafts, transmission means coupling said shafts and said motive mechanism, and means at said motive mechanism for varying the driving relation of said shafts to said mechanism to adjust the location of said arcs of movement of said shafts relative to said windshield, said motive mechanism including an output shaft, said last named means being accessible externally of said motive mechanism, said transmission means including means mounted on said output shaft for movement therewith, and said means at said motive mechanism providing for adjustment of said means mounted on said output shaft relative to said output shaft.

16. In a vehicle windshield wiper system, a plurality of spaced wiper actuating shafts, motive mechanism for moving said shafts through corresponding arcs of movement and adapted to be carried by said vehicle remotely from said shafts, transmission means coupling said shafts and said motive mechanism, and means at said motive mechanism for varying the driving relation of said shafts to said mechanism to adjust the location of said arcs of movement of said shafts relative to said windshield, said motive mechanism including an output shaft and a member mounted thereon in fixed relation thereto, said transmission means including means adjacent said motive mechanism, and said means at said motive mechanism including means securing said means adjacent said motive mechanism to said member for movement therewith.

EMIL E. SIVACEK.

REFERENCES CITED

The following references are of record in the file of this patent:

UNITED STATES PATENTS

| Number | Name | Date |
| --- | --- | --- |
| 1,022,134 | Heckert | Apr. 2, 1912 |
| 1,491,834 | Van Loozen | Apr. 29, 1924 |
| 1,516,722 | Folberth et al. | Nov. 25, 1924 |
| 2,082,485 | Evans | June 1, 1937 |
| 2,137,628 | Sayre | Nov. 22, 1938 |
| 2,173,447 | Horton | Sept. 19, 1939 |
| 2,286,035 | Horton | June 9, 1942 |
| 2,332,123 | Whitted | Oct. 19, 1943 |

FOREIGN PATENTS

| Number | Country | Date |
| --- | --- | --- |
| 408,318 | Great Britain | Apr. 9, 1934 |
| 422,217 | Great Britain | Jan. 8, 1935 |